(12) United States Patent
Power et al.

(10) Patent No.: US 10,389,209 B2
(45) Date of Patent: Aug. 20, 2019

(54) HYDROELECTRIC TURBINES, ANCHORING STRUCTURES, AND RELATED METHODS OF ASSEMBLY

(71) Applicant: OCEANA ENERGY COMPANY, Washington, DC (US)

(72) Inventors: Daniel E. Power, Pace, FL (US); Ned Hansen, Hyde Park, UT (US)

(73) Assignee: OCEANA ENERGY COMPANY, Washington, DC (US)

( * ) Notice: Subject to any disclaimer, the term of this patent is extended or adjusted under 35 U.S.C. 154(b) by 0 days.

(21) Appl. No.: 15/313,288

(22) PCT Filed: May 28, 2015

(86) PCT No.: PCT/US2015/032948
§ 371 (c)(1),
(2) Date: Nov. 22, 2016

(87) PCT Pub. No.: WO2015/184122
PCT Pub. Date: Dec. 3, 2015

(65) Prior Publication Data
US 2017/0207680 A1    Jul. 20, 2017

Related U.S. Application Data

(60) Provisional application No. 62/005,614, filed on May 30, 2014, provisional application No. 62/005,681, filed on May 30, 2014.

(51) Int. Cl.
*H02K 7/18* (2006.01)
*F03B 11/06* (2006.01)
(Continued)

(52) U.S. Cl.
CPC ............ *H02K 7/1823* (2013.01); *F03B 11/06* (2013.01); *F03B 17/061* (2013.01);
(Continued)

(58) Field of Classification Search
CPC ...... H02K 1/2786; H02K 7/09; H02K 7/1823; F03B 17/061
See application file for complete search history.

(56) References Cited

U.S. PATENT DOCUMENTS 1,937,213 A * 11/1933 White .................... H02K 99/00
310/168
3,992,125 A * 11/1976 Schilling ............... F03B 17/068
415/5
(Continued)

FOREIGN PATENT DOCUMENTS

CN      1714493 A     12/2005
CN    102257267 A     11/2011
(Continued)

OTHER PUBLICATIONS

International Search Report from corresponding International Patent Application No. PCT/US2015/032948, dated Aug. 27, 2015.
(Continued)

*Primary Examiner* — Sean Gugger
(74) *Attorney, Agent, or Firm* — Jones Robb, PLLC

(57) ABSTRACT

A hydroelectric turbine may include a stator comprising a first plurality of electricity-generating elements and a rotor comprising a second plurality of electricity-generating elements. The rotor may be disposed radially outward of an outer circumferential surface of the stator and configured to rotate around the stator about an axis of rotation. The rotor may be a flexible belt structure. The turbine may further include at least one bearing mechanism configured to support the rotor relative to the stator during rotation of the rotor around the stator.

13 Claims, 8 Drawing Sheets

(51) Int. Cl.
  *F03B 17/06* (2006.01)
  *H02K 1/27* (2006.01)
  *H02K 7/09* (2006.01)
  *F16C 17/14* (2006.01)
  *F16C 33/18* (2006.01)
  *F16C 32/04* (2006.01)

(52) U.S. Cl.
  CPC ............ *H02K 1/2786* (2013.01); *H02K 7/09* (2013.01); *F05B 2220/32* (2013.01); *F05B 2220/706* (2013.01); *F05B 2230/40* (2013.01); *F05B 2230/60* (2013.01); *F05B 2240/53* (2013.01); *F05B 2240/97* (2013.01); *F05B 2260/4021* (2013.01); *F16C 17/14* (2013.01); *F16C 32/0423* (2013.01); *F16C 33/18* (2013.01); *F16C 2360/00* (2013.01); *H02K 2205/03* (2013.01); *Y02E 10/28* (2013.01); *Y02P 70/527* (2015.11)

(56) References Cited

U.S. PATENT DOCUMENTS

| | | | | |
|---|---|---|---|---|
| 4,163,904 | A * | 8/1979 | Skendrovic | F03B 13/10 277/369 |
| 4,720,640 | A * | 1/1988 | Anderson | F03B 13/083 290/43 |
| 7,190,087 | B2 | 3/2007 | Williams | |
| 2003/0110615 | A1 | 6/2003 | Ku et al. | |
| 2005/0005592 | A1 * | 1/2005 | Fielder | C02F 1/04 60/200.1 |
| 2006/0071577 | A1 * | 4/2006 | Takeuchi | H02K 7/116 310/268 |
| 2009/0096216 | A1 | 4/2009 | Power, III et al. | |
| 2009/0278357 | A1 | 11/2009 | Williams | |
| 2010/0007148 | A1 | 1/2010 | Davis et al. | |
| 2010/0026002 | A1 | 2/2010 | Spooner | |
| 2011/0110770 | A1 * | 5/2011 | Spooner | F03B 11/063 415/173.1 |
| 2011/0291419 | A1 * | 12/2011 | Dunne | E02B 9/08 290/53 |
| 2011/0298216 | A1 * | 12/2011 | Ives | E02B 9/08 290/53 |
| 2012/0187693 | A1 * | 7/2012 | Houvener | F03B 17/061 290/54 |
| 2012/0211990 | A1 * | 8/2012 | Davey | F03B 13/264 290/54 |
| 2013/0261001 | A1 * | 10/2013 | Hull | H02K 7/025 505/166 |
| 2014/0369841 | A1 | 12/2014 | Duchene et al. | |

FOREIGN PATENT DOCUMENTS

| | | |
|---|---|---|
| CN | 102597498 A | 7/2012 |
| EP | 2199601 A1 | 6/2010 |
| JP | 62-144559 A | 6/1987 |
| JP | 2013509535 A | 3/2013 |
| WO | 2017/070180 A1 | 4/2017 |

OTHER PUBLICATIONS

Written Opinion from corresponding International Patent Application No. PCT/U52015/032948, dated Aug. 27, 2015.
Supplementary European Search Report from corresponding International Patent Application No. PCT/US2015/032948, dated Jan. 26, 2018.
International Search Report from related International Patent Application No. PCT/US2016/057659, dated Jan. 6, 2017.
Written Opinion from related International Patent Application No. PCT/US2016/057659, dated Jan. 6, 2017.
Chinese Notification of the First Office Action issued in Application No. 201580034846.X, dated Jun. 4, 2018.
Chinese Notification of the Second Office Action issued in Application No. 201580034846.X, dated Mar. 27, 2019.
Japanese Office Action issued in Application No. 2016-571081, dated May 7, 2019.

* cited by examiner

HYDROELECTRIC TURBINES, ANCHORING STRUCTURES, AND RELATED METHODS OF ASSEMBLY

CROSS-REFERENCE TO RELATED APPLICATIONS

This application is a National Stage application of International Application No. PCT/US2015/032948, filed May 28, 2015, which claims priority to U.S. Provisional Patent Application No. 62/005,614, filed May 30, 2014 and entitled "Hydroelectric Turbine," and to U.S. Provisional Patent Application No. 62/005,681, filed May 30, 2014 and entitled "Hydroelectric Turbine, Anchoring Structure, and Related Methods of Assembly," the entire content each of which is incorporated by reference herein.

TECHNICAL FIELD

The present disclosure relates generally to turbines, and more particularly, to hydroelectric turbines.

INTRODUCTION

The section headings used herein are for organizational purposes only and are not to be construed as limiting the subject matter described in any way.

A hydroelectric turbine can be used to generate electricity from the current in a moving body of water (e.g., a river or ocean current) or other fluid source. Tidal power, for example, exploits the movement of water caused by tidal currents, or the rise and fall in sea levels due to tides. As the waters rise and then fall, a flow, or current, is generated. The one-directional flow of a river also creates a current that may be used to generate electricity. And, additional forms of differential pressure, such as, for example, that are created by dams, also can cause water to flow and create water speeds sufficient to enable the conversion of energy associated with the water's flow to other useful forms of energy.

Tidal power, which relies on the natural movement of currents in a body of liquid (e.g., water), is classified as a renewable energy source. Unlike other renewable energy sources, such as wind and solar power, however, tidal power is reliably predictable. Water currents are a source of renewable power that is clean, reliable, and predictable years in advance, thereby facilitating integration with existing energy grids. Additionally, by virtue of the basic physical characteristics of water (including, e.g., seawater), namely, its density (which can be 832 times that of air) and its non-compressibility, this medium holds unique "ultra-high-energy-density" potential in comparison to other renewable energy sources for generating renewable energy. This potential is amplified once the volume and flow rates present in many coastal locations and/or useable locations worldwide are factored in.

Tidal power, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Electricity generation using hydroelectric turbines (which convert energy from fluid currents) is generally known. An example of such a turbine is described, for example, in U.S. Publication No. 2012/0211990, entitled "Energy Conversion Systems and Methods," which is incorporated by reference in its entirety herein. Such turbines can act like underwater windmills, and have a relatively low cost and ecological impact. In various hydroelectric turbines, for example, fluid flow interacts with blades that rotate about an axis and that rotation is harnessed to thereby produce electricity or other forms of energy.

Hydroelectric turbines, however, can pose various challenges relating to the stress and/or strain on the various components of the turbine resulting from the interaction of the relatively strong forces associated with fluid flow (e.g., moving currents which are often intermittent and turbulent). For example, as a fluid current (e.g., tidal current) interacts with the turbine, there is an amount of thrust that acts on the various components, which may cause displacement of one or more components, particularly components configured to move relative to stationary components. Additional challenges may arise with regard to supporting and anchoring such turbines within a moving current, and assembling such complex turbines at an installation location.

It may, therefore, be desirable to provide a hydroelectric turbine having a robust configuration that can withstand the strong, intermittent, and turbulent forces (e.g., axial and/or radial) associated with fluid flow interacting therewith. It also may be desirable to provide a support structure to anchor the turbine in a stationary position within the fluid flow. It may further be desirable to provide a method of efficiently assembling the turbine on-site to reduce the expense of shipping the assembly from a manufacturing plant to the installation location.

SUMMARY

The present disclosure solves one or more of the above-mentioned problems and/or achieves one or more of the above-mentioned desirable features. Other features and/or advantages may become apparent from the description which follows.

In accordance with various exemplary embodiments of the present disclosure, a hydroelectric turbine may include a stator comprising a first plurality of electricity-generating elements and a rotor comprising a second plurality of electricity-generating elements. The rotor may be disposed radially outward of an outer circumferential surface of the stator and configured to rotate around the stator about an axis of rotation. The rotor may be a flexible belt structure. The turbine may further include at least one bearing mechanism configured to support the rotor relative to the stator during rotation of the rotor around the stator.

In accordance with various additional exemplary embodiments of the present disclosure, a hydroelectric turbine system may include a bridge assembly comprising a central supporting ring having an axially extending tongue. The system may also include a stator having a radially inner circumferential surface disposed on a radially outer surface of the tongue. The system may further include a rotor supported radially outward of the stator and configured to rotate relative to the stator about an axis of rotation.

In accordance with various additional exemplary embodiments of the present disclosure, a bridge assembly for a hydroelectric turbine may include a central supporting ring having an axially extending tongue. The bridge assembly may also include a pair of attachment blocks. The supporting ring may be disposed between the pair of attachment blocks. The bridge assembly may further include support arms extending from the attachment blocks to the central supporting ring. The tongue of the supporting ring may have a radially outer surface configured to support a radially inner circumferential surface of a stator of the hydroelectric turbine.

In accordance with various further exemplary embodiments of the present disclosure, a method of manufacturing a hydroelectric turbine system may include fabricating a bridge assembly. The bridge assembly may include a central support ring with an axially extending tongue and a plurality of support arms connected to the support ring at respective ends thereof. The method may also include assembling a stator on the tongue by placing the stator around a circumference of the tongue. The method may further include placing a flexible belt-like rotor around a radially outer circumferential surface of the assembled stator.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the present disclosure and claims, including equivalents. It should be understood that the present disclosure and claims, in their broadest sense, could be practiced without having one or more features of these exemplary aspects and embodiments.

BRIEF DESCRIPTION OF THE DRAWINGS

The accompanying drawings, which are incorporated in and constitute a part of this specification, illustrate some exemplary embodiments of the present disclosure and together with the description, serve to explain certain principles. In the drawings

DESCRIPTION OF EXEMPLARY EMBODIMENTS

Figure 1A:
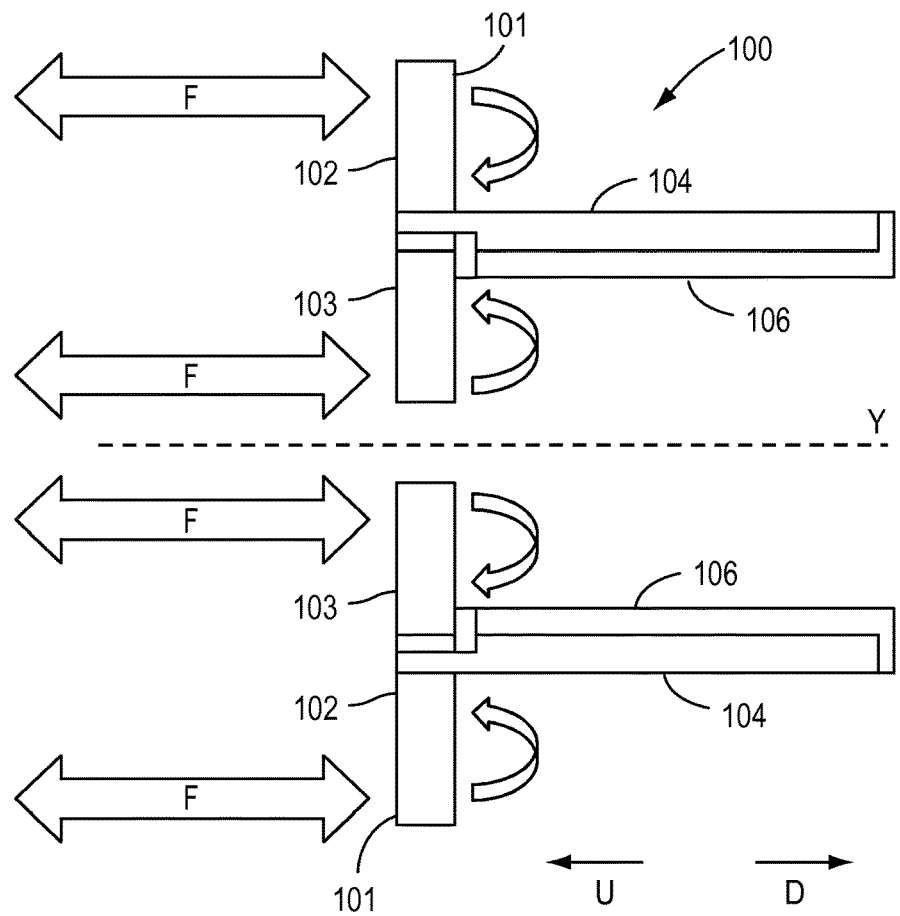
FIG. 1A is a cross-sectional view illustrating flow forces on an exemplary embodiment of a hydroelectric turbine in accordance with the present disclosure.

In accordance with one or more exemplary embodiments of the present disclosure, energy in a fluid flow can be directly converted to electricity by the use of magnets embedded in a rotor, wherein the rotor includes an inner rim and at least one hydrofoil blade. The rotor can be supported such that it rotates around an outside surface of a stator, which may be embedded with a core with windings. The fluid flow acts on the at least one blade thereby causing the rotor to rotate, which in turn causes the rotor magnets to move past the stator windings to generate electricity in the core. Additional sets of magnets can be embedded in the rotor and stator housings to levitate and separate those components during rotation of the rotor and also to prevent the rotor from being forced axially out or alignment with the stator (e.g., upstream and/or downstream), or otherwise off of the stator housing, by the fluid flow.

As would be understood by those of ordinary skill in the art, the terms upstream and downstream may each refer to a direction relative to the current fluid flow, or the flow of current in the body of water. Accordingly, for ease of explanation, as illustrated in FIGS. 1A, 3, 6, and 7, for a one-directional flow (e.g., for river applications) upstream may refer to a direction U against the flow of the current, for example, from back to front of the turbine along the axial direction of the turbine (depicted as Y in some of the drawings). And, the term downstream may refer to a direction D with the flow of the current, for example, from the back to front of the turbine along the axial direction of the turbine. Those of ordinary skill in the art would understand, however, that with a bi-directional flow (e.g., for tidal applications where there is both an ebb and flow of the current) there is no true upstream and downstream. Furthermore, although the overall movement of a fluid current at any given time is generally in a single direction, the current flowing through a hydroelectric turbine may also have some differing directional components.

As will be explained further below, configuring a hydroelectric turbine so that the rotor is disposed outwardly of the stator can provide for a robust configuration of the turbine, potentially enhancing stability and strength, and reducing the amount of materials used to construct the turbine structure.

In various additional embodiments of the present disclosure, the stator can be assembled on and supported by a bridge assembly that couples the hydroelectric turbine to an anchoring system configured to anchor the turbine in a stationary position within the fluid. The bridge assembly can be designed to hold the turbine in the fluid flow and support the turbine with respect to both axial and radial forces.

In various exemplary embodiments, the bridge assembly can be formed as a monolithic piece, for example, from a continuous pour of composite material. The bridge assembly can be removably attached to vertical members of the anchoring system. For example, the anchoring system can be a tri-frame member disposed in a substantially horizontal plane, with the vertical members disposed at or proximal to a maximum width of the tri-frame member so as not to unduly block flow energy from driving the hydroelectric turbine. The bridge assembly and/or the anchoring system may be designed so as to be fabricated on-site, thereby saving, or at least reducing, the expense of shipping the assembly from a manufacturing plant to an installation location.

In various exemplary embodiments, the rotor can be configured as separate pieces to be assembled on a portion of the bridge assembly, for example, an axially extending tongue of a central support cylinder. Each rotor piece can be an arcuate segment of a closed-loop (e.g., circular) rotor and configured to fit together around the outer circumference of the stator (which is attached to a tongue of the bridge assembly), with no or minimal spacing between circumferentially adjacent pieces. The rotor can be configured, for example, as a flexible belt that sits radially outward of the stator and the tongue of the bridge assembly. For example, the stator and the rotor may be shipped from a manufacturing plant to the installation location for assembly to the anchoring system.

As used herein, the term flexible generally refers to the capability of the rotor belt to bend without breaking. Thus, in accordance with various exemplary embodiments of the present disclosure, the rotor may be considered as having an amount of flex such that the rotor may take the shape of a cylindrical belt-like structure without breaking.

Hydroelectric Turbine Configurations

Figure 1B:
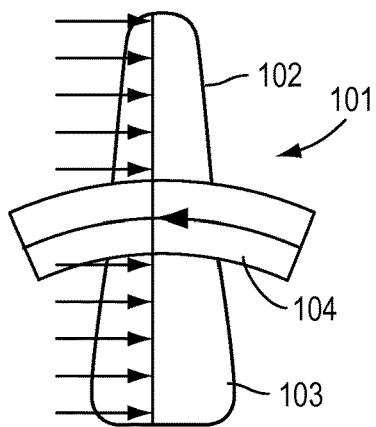
FIG. 1B is a partial, front view of a blade of the hydroelectric turbine of FIG. 1A.

With reference now to FIGS. 1A and 1B, an exemplary embodiment of a hydroelectric turbine 100 in accordance with the present disclosure is shown. The hydroelectric turbine 100 includes a rotor 104 disposed radially outward of a stator 106. In this arrangement, one or more blades (hydrofoils) 101 can extend radially inward and/or radially outward. For example, with reference to the exemplary embodiment of FIG. 1A, there may be a radially inward extending blade portion 103 and a radially outward extending blade portion 102. Both blade portions 102, 103 are arranged in the fluid flow (designated by the arrows in FIG. 1A) to thereby cause the rotor 104 to rotate relative to the stator 106 about a central axis Y. In various exemplary embodiments (see, e.g., FIG. 2) a plurality of blades can be mounted around the circumference of the rotor 104.

Mounting the rotor 104 outside of the stator 106 may, for example, permit the rotor 104, or at least the portions of the rotor 104 between mounting regions for blade portions 102, 103, to be configured as a semi-rigid belt that provides some flex over a large diameter (e.g., on the order of up to 30 feet). In various exemplary embodiments, the rotor may be made from Kevlar or a carbon-fiber material. For example, the rotor 104 illustrated in the embodiment of FIG. 1A may take advantage of the inwardly disposed stator 106 to support (e.g., against the effects of gravity) the rotor 104 in a substantially closed loop configuration. In contrast, in a configuration wherein the rotor is disposed inward of the stator, the rotor may need to be more rigid in order to maintain the outer surface of the rotor adjacent the inner surface of the stator. Thus, the rotor 104 in the configuration illustrated in FIG. 1A may benefit from reduced weight, less materials, and/or use of less expensive materials as a result of the reduced support requirements for the rotor. In addition, the rotor 104 may be relatively thin in a radial direction to minimize non-productive drag in the fluid flow.

The rotor 104 may ride on the outer surface of the stator 106 much like a belt or rope over a pulley (except, as explained below, spaced a small distance from the stator as a result of the bearing system as it rotates), thereby allowing the rotor 104 to bend/flex ever so slightly as it rotates. As a result, the rotor 104 may be more resilient and less costly to manufacture and ship due to a reduction in the amount of materials needed to fabricate the rotor 104. In addition, the rotor 104 can be in tension, rather than compression, when disposed around the stator 106, while the stator 106 is in compression. This may permit the rotor 104 to have increased strength while using less material.

Blades of the turbine in one or more exemplary embodiments of the disclosed subject matter can be attached toward the front rim of the rotor and blade portions can extend in substantially opposite directions (e.g., radially away from the center of the rotor (radially outward) and radially toward the center of the rotor (radially inward)). As illustrated in FIGS. 1A and 1B, for example, the rotor 104 can have blades 101 with a radially inward extending blade portion 103 and a radially outward extending blade portion 102 attached thereto. The arrangement of the rotor 104 radially outward of the stator 106 may facilitate the arrangement of the radially inward and outward extending blade portions 102, 103. Thus, the blade portions 102, 103 may collect flow energy from the fluid flow F in sweeps away from the central axis of rotation Y and in sweeps toward the central axis of rotation Y, respectively. This may help to balance the forces acting on the rotor, thereby reducing stresses on the rotor 104 and allowing for the use of less material in both the rotor 104 and the blades 101.

In various exemplary embodiments, each blade portion 102 can be an integral part of a respective blade portion 103 to form a single blade (hydrofoil) 101. Alternatively, in various additional embodiments, each blade portion 102 can be formed separate from and be subsequently attached to a respective blade portion 103 to form a single blade 101. In yet various additional embodiments, blade portions 102, 103 can be formed separate from each other and attached separately to the rotor 104.

In accordance with various exemplary embodiments of the present disclosure, the location at which each blade 101 (or coupled blade portions) attaches to the rotor 104 can act as a fulcrum for that blade. Thus, flow energy on the radially inward extending portion 103 of the blade 101 (e.g., within the rotor circumference) and flow energy on the radial outward extending portion 102 of the blade 101 (e.g., outside the rotor circumference) may act to balance the moment forces as the blades 101 sweep the current, as illustrated in FIGS. 1A and 1B. This balancing of the flow energy over the rotor's rim may allow for less structural material to be used in the manufacture of both the blades and the rotor.

Accordingly, because the stator 106 supports the rotor 104 and the blades 101 on the rotor 104 are configured in a balanced arrangement (e.g., radially inward and radially outward), as illustrated in FIGS. 1A and 1B, the amount of material (e.g., expensive composite material) needed to build the rotor 104 can be reduced, which may also reduce fabrication and assembly costs, as well as facilitate installation of the turbine 100.

Figure 2:
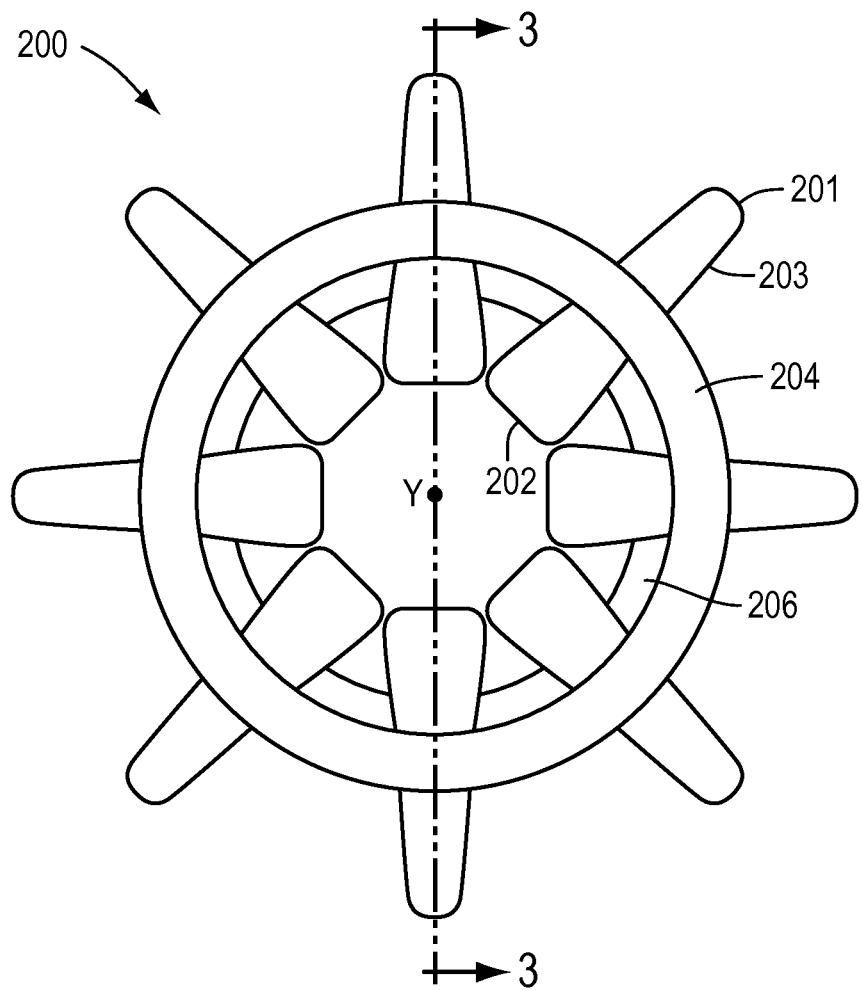
FIG. 2 is a front view of another exemplary embodiment of a hydroelectric turbine in accordance with the present disclosure.
Figure 3:
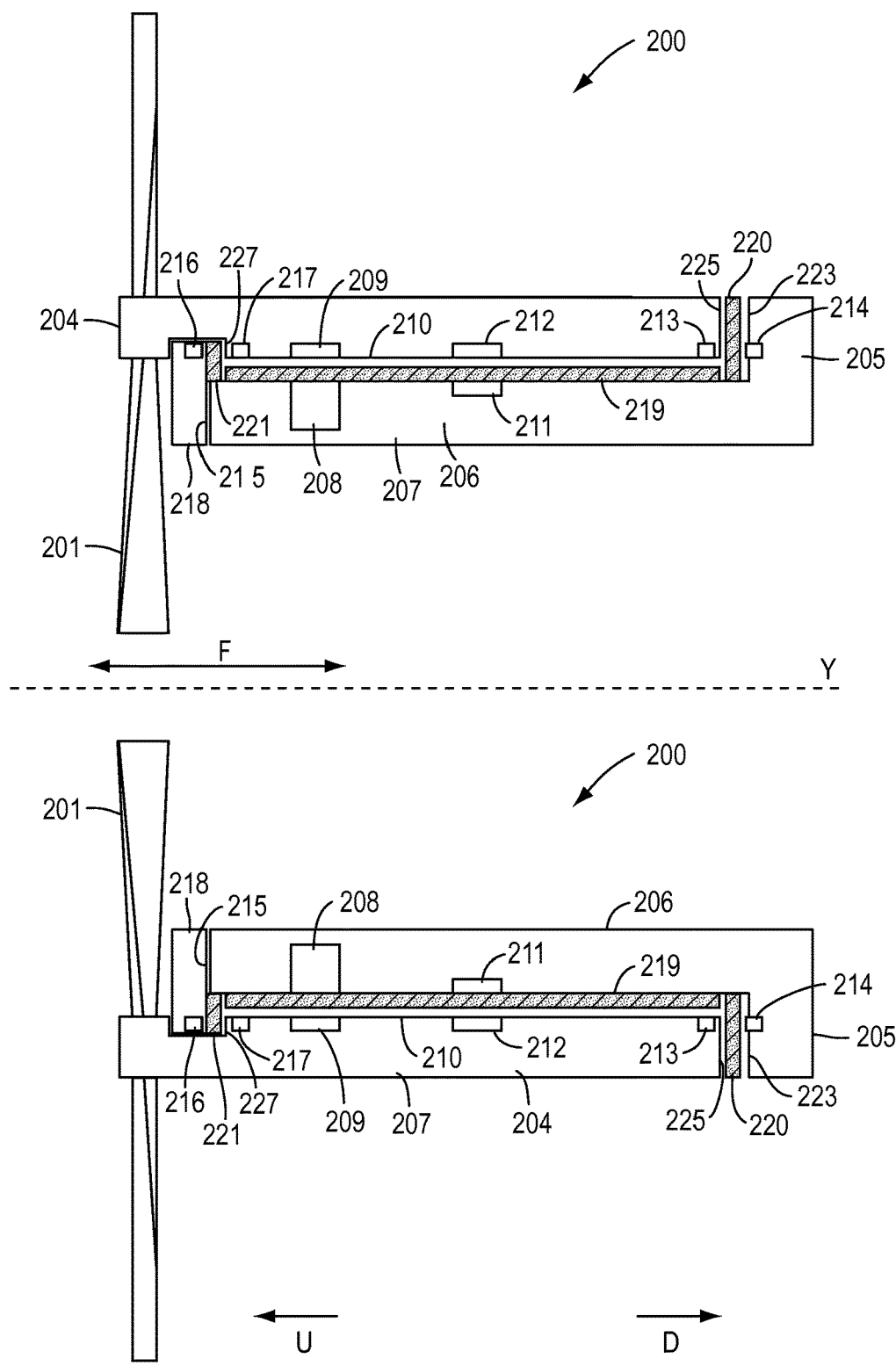
FIG. 3 shows cross-sectional views of the hydroelectric turbine of FIG. 2 taken through line 3-3, showing both the upper half and lower half of the cross-section.

Referring now to FIGS. 2 and 3, another exemplary embodiment of a hydroelectric turbine 200 in accordance with the present disclosure is shown. Similar to the embodiment of FIGS. 1A and 1B, the hydroelectric turbine 200 includes a rotor 204 that is disposed radially outward of a stator 206. The turbine 200 can be positioned in a body of water (e.g., a river or ocean) or otherwise in the path of a fluid flow, and held stationary within a moving current or alternatively towed within a body of fluid to generate a current effect. One or more blades 201 can be attached to the rotor 204, for example, at a front rim thereof (e.g., an upstream end). Each blade 201 can have radially inward extending and radially outward extending blade portions 202, 203, which may be separately formed or formed as an integral piece, as described above. As illustrated in FIG. 3, in various exemplary embodiments, the stator 206 can have a generally L-shaped cross-section, with a short leg 205 of the L extending radially outward to align with the rotor 204, and a long leg 207 of the L extending axially along an inner circumferential surface of the rotor 204.

In various embodiments, the rotor 204 may include one or more electricity-generating magnets, which are disposed with respect to one or more corresponding electricity-generating elements of the stator 206 when installed in the turbine 200. In various additional embodiments, the stator 206 may include one or more electricity-generating magnets disposed with respect to one or more corresponding electricity-generating elements of the rotor 204. The electricity-generating elements may, for example, comprise at least one coil 208 with windings configured to generate electricity in response to rotational movement of electricity-generating magnets 209 on the rotor 204.

The rotor 204, for example, may include one or more magnets 209 for generating electricity, which are disposed radially adjacent to, but spaced from, the at least one coil 208 of the stator 206. The magnets 209 can be mechanically attached to an inner rim 210 of the rotor 204 or can be disposed within an interior of the rotor 204 proximal to the inner rim 210. Accordingly, fluid flow interacting with the blades 201 causes the rotor 204 to rotate over the outside surface of the stator 206. And, the rotation of magnets 209 in the rotor 204 induces a voltage in the coils 208 disposed in the stator 206 (e.g., in a stator housing). The coils 208 may be connected together in such a way so as to produce electricity of a desired voltage and/or current. The resulting electricity can then be transmitted via wires (not shown) for subsequent use or storage, for example, via one or more transmission lines or conductors connected to a land-based electrical grid.

In various exemplary embodiments, adjacent blades 201, whether extending radially inward and/or outward, can be angularly spaced around the circumference of the rotor 204 at a range from about 20 degrees to about 60 degrees between adjacent blades 201.

In various exemplary embodiments, one or more sets of levitation magnets 211, 212 can be disposed for radially aligning and levitating the rotor 204 relative to the stator 206. In an exemplary embodiment, the magnets 212 can be mechanically attached to an inner rim 210 of the rotor 204 or disposed within the body of the rotor 204 proximate to or at the inner rim 210, and the magnets 211 can be mechanically attached to a radially outer surface of the stator 206 or disposed within the body of the stator 206 proximate to or at the radially outer surface. The set of magnets 211, 212 can be arranged radially adjacent to (but spaced from) each other with like poles facing so as to generate a repulsive force in a substantially radial direction. The repulsion force between one or more groups of magnets 211, 212 can aid in maintaining alignment of the rotor 204 with respect to its rotational axis Y, and thereby the stator 206.

In various additional exemplary embodiments, one or more sets of levitation magnets 213, 214 can be disposed for assisting in maintaining relative axial positioning of the rotor 204 relative to the stator 206. The magnets 213 can be mechanically attached proximate to or at an end of the inner rim 210 of the rotor 204 adjacent the short leg 205 of the stator 206 (e.g., at a downstream end of the inner rim 210) or be disposed within a body of the rotor 204 proximate to or at an end of the rotor 204 adjacent the short leg 205 of the stator 206. And, the magnets 214 can be mechanically attached to a radially extending surface 223 of the short leg 205 of the stator 206 or be disposed within the body of the short leg 205 of the stator 206 proximate to the radially extending surface 223 of the short leg 205 of the stator 206. The one or more sets of magnets 213, 214 can be arranged axially adjacent to (but spaced from) each other with like poles facing so as to generate a repulsive force in a substantially axial direction (e.g., parallel to rotational axis Y). The repulsion force between one or more sets of magnets 213, 214 can therefore aid in maintaining alignment of the rotor 204 with respect to the stator 206 and prevent the rotor 204 from moving axially relative to the stator 206 (e.g., being forced downstream) due to the fluid flow from the current or other forces.

In various further embodiments, the short leg 205 of the stator 206 can serve as a shutdown bearing to back-up the one or more sets of magnets 213, 214, and prevent the rotor 204 from potentially being displaced in direction toward the short leg 205 (e.g., downstream) and out of axial alignment with the stator 206. The short leg 205 of the stator 206 may also help prevent the rotor 204 from moving axially relative to and out of alignment with the stator 206 during shut down or maintenance of the turbine 200. Alternatively, a separate shut down bearing can be provided, in which the magnet 214 may be placed within the separate stop. The separate shut down bearing can then attach to the stator 206 at the short leg 205 such that the magnet 214 opposes the magnet 213 of the rotor 204.

In various additional exemplary embodiments, the rotor 206 can further include one or more sets of magnets 216, 217 which, similar to the magnets 213, 214, can be configured to assist in maintaining axial alignment of the rotor 204 relative to the stator 206. In an exemplary embodiment, as shown in FIG. 3, for example, a front stop 218 (or cap) can be provided at the opposite end of the stator 206 to prevent the rotor 204 from sliding off a front end of the stator 206 (the end opposite the short leg 205 of the L), and can further include one or more magnets 216. The magnets 217 can be mechanically attached to the inner rim 210 of the rotor 204 or be disposed within a body of the rotor 204 proximate to the inner rim 210. The magnets 216 can be mechanically attached to a radially extending surface 215 of the front stop 218 or be disposed within the body of the front stop 218 proximal to the radially extending surface 215 of the stop 218. The one or more sets of magnets 216, 217 can be arranged adjacent to (but axially spaced from) each other with like poles facing so as to generate a repulsive force in a substantially axial direction. The repulsion force between one or more sets of magnets 216, 217 can aid in maintaining axial alignment of the rotor 204 with respect to the stator 206 and prevent the rotor 204 from being moved axially relative to and out of alignment with the stator 206 due to the current or other forces.

The front stop 218 (or cap) can serve as a stop to back-up the one or more sets of magnets 216, 217, and prevent the rotor 204 from potentially being displaced axially in a direction away from the short leg 205 of the stator 206 (e.g., upstream) and out of axial alignment with the stator 206. As above, the front stop 218 also may help prevent the rotor 204 from moving axially relative to and out of alignment with the stator 206 during, for example, shut down or maintenance of the turbine 200. Alternatively, the stator 206 can be provided with a separate radially extending portion instead of stop 218, in which case the one or more magnets 216 may be placed within the separate portion of the stator 206 such that the one or more magnets 216 oppose the magnets 217 of the rotor 204.

As noted above, to maintain alignment of the rotor 204 with the stator 206 and prevent the rotor 204 from being forced out of axial alignment with the stator 206 (e.g., being forced downstream or upstream by the fluid flow), opposing magnets 211, 212; 213, 214; and 216, 217 can been embedded in the rotor's periphery and the stator (e.g., in the stator housing), for example, in a radial direction and parallel to the rotational axis Y of the turbine 200. By virtue of the arrangement of the sets of magnets 211, 212; 213, 214; and 216, 217, the rotor 204 can be configured to freely float (levitate) relative to an outer circumferential surface of the stator 206 as the rotor 204 rotates around the stator 206. Thus, the rotor 204 can be held in place with respect to the stator 206 without a mechanical attachment of the rotor 204 to the stator 206 or to a turbine housing (not shown). This may have the advantage of increasing turbine efficiency by reducing friction, as well as other advantages. Other configurations and arrangements for magnets that support the rotor with respect to the stator are also possible, for example, as described in U.S. Publication No. 2012/0211990, incorporated by reference above.

As would be understood by those of ordinary skill in the art, the sets of levitation magnets 211, 212; 213, 214; and 216, 217 shown and described with respect to FIG. 3 are exemplary only and may have various arrangements and configurations, and/or may be replaced or used in conjunction with any known bearing mechanism and/or system. Various embodiments of the present disclosure contemplate, for example, using hydrodynamic bearings, including, for example, an elastic polymer alloy bearing system, such as, for example, a Thordon COMPAC bearing as commercially available from Thordon Bearing Inc. of Burlington Ontario, as the radial bearing instead of the levitation magnets 211, 212 and/or as the axial bearing instead of the levitation magnets 213, 214 and 216, 217. Various additional embodiments of the present disclosure contemplate using water lubricated bearings made of wood or composite materials, such as, for example, a wood composite as commercially available from Lignum-Vitae North America of Powhatan Va. instead of the levitation magnets 211, 212 and/or instead of the levitation magnets 213, 214 and 216, 217.

Figure 10:
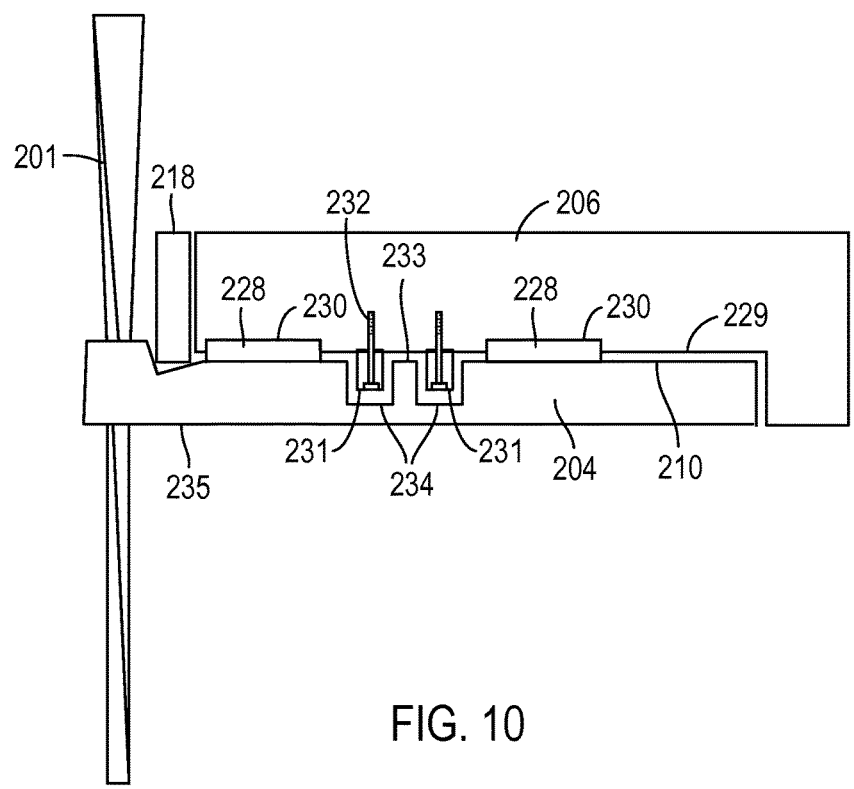
FIG. 10 is a partial, detailed view of the lower half of a cross-sectional view of another exemplary embodiment of a hydroelectric turbine in accordance with the present disclosure.

As illustrated in FIG. 10, such embodiments contemplate, for example, using strips of wood or a wood composite (e.g., Lignum-Vitae) 228 arranged along an outer circumferential surface 229 of the stator 206 (e.g., 2×4 pieces of composite 228 pushed into slots 230 within the concrete of the stator 206) to serve as a radial bearing between the rotor 204 and the stator 206. Such embodiments, further contemplate using a pattern of intermeshing teeth 231 and 233 to contain the axial forces of the turbine 200, as also illustrated in FIG. 10. A row of wood or wood composite (e.g., Lignum-Vitae) teeth 231 may, for example, be affixed (e.g., via a bolt 232) to the outer circumferential surface 229 of the stator 206 and reach up into slots 234 formed in an inner circumferential surface (i.e. inner rim 210) of the rotor 204 (e.g., forming the tooth 233). The slots 234 may fitted with a bearing surface, such as, for example, stainless steel rings (not shown) configured to slide over the sides of the teeth 231. In this manner, the fluid (e.g., sea water) within each slot 234 may provide a hydrodynamic bearing effect to contain the axial load of the turbine 200.

Although, if another type of bearing system is used, the surfaces of the rotor 204 and stator 206 may need to be aligned with each other to prevent a hydroelectric effect, as would be further understood by those of ordinary skill in the art. It would be further understood by those of ordinary skill in the art that depending on a particular turbine application, different arrangements of levitation magnets and/or other bearing mechanisms may be used to provide the required radial and/or axial alignment of the rotor with respect to the stator. For example, in applications in which the turbine is placed in a river and collects energy from only one direction of flow, the axial bearings will only need to be placed on one end of the turbine.

In various additional embodiments of the present disclosure, for example, the turbine 200 can further include one or more bearing materials disposed between the stator 206 and the rotor 204. For example, the stator 206 can have a water-lubricated (or other fluid-lubricated) bearing material 219 attached to its radially outer surface and opposing the inner rim 210 of the rotor 204. Alternatively, the bearing material 219 may be an integral part of the outer surface of stator 206.

The bearing material 219 can aid the one or more sets of magnets 211, 212 in maintaining central alignment of the rotor 204 relative to the rotational axis Y of the turbine 200. Optionally, the rotor 204 can have a reduced friction smooth surface at its inner rim 210, for example, a polished metal or porcelain-like surface that would contact the bearing material 219, for example when the magnets 211, 212 fail to maintain central alignment of the turbine 200. Such a surface may assist in reducing friction during periods of misalignment. Moreover, the bearing material 219 can occupy most or at least a major portion of the radial area between the outer surface of the stator 206 (and the coils 208 of the stator 206) and the inner rim 210 of the rotor 204 (and the magnets 209 of the rotor 204), thereby displacing some of the fluid (e.g., saltwater) that would otherwise be contained there between.

A bearing material 220 can also be provided between the stator 206 and the rotor 204 at an end of the turbine 200 opposite the blades 201 (e.g., a downstream end of the turbine 200), for example, between a radially extending edge 225 of the rotor 204 and the short leg 205 of the L (i.e., the radially extending surface 223) of the stator 206. Alternatively, the bearing material 220 can be attached to the leg 205 of the stator 206 or be formed as an integral part of the leg 205 of the stator 206. The bearing material 220 can aid the magnets 213, 214 in maintaining axial alignment of the rotor 204 with respect to the stator 206. Optionally, the rotor 204 can have a reduced friction smooth surface along its radially extending edge 225, for example, a polished metal, porcelain-like, or composite material surface that would contact the bearing material 220 when the magnets 213, 214 fail to maintain axial alignment of the turbine 200. The bearing material 220 can also occupy most or at least a major portion of the axial area between the short leg 205 of the stator 206 (and the magnets 214 of the stator 206) and the radially extending edge 225 of the rotor 204 (and the magnets 213 of the rotor 204), thereby displacing some of the fluid (e.g., saltwater) that would otherwise be contained there between.

In a similar manner, a bearing material 221 can additionally be provided between the front stop 218 and the rotor 204 at an end of the turbine adjacent the blades 201 (e.g., an upstream end of the turbine 200), for example, between a radially extending edge 227 of the rotor 204 and the radially extending surface 215 of the front stop 218. For example, the bearing material 221 can be attached to the front stop 218 or formed as an integral part of the front stop 218. The bearing material 221 can aid the magnets 216, 217 in maintaining axial alignment of the rotor 204 with respect to the stator 206. Optionally, the rotor 204 can have a reduced friction smooth surface along its radially extending edge 227, for example, a polished metal, porcelain-like, or composite material surface that would contact the bearing material 221 when the magnets 216, 217 fail to maintain axial alignment of the turbine 200. The bearing material 221 can also occupy most or at least a major portion of the axial area between the surface of the stop 218 (and the magnets 216 of the stop 218) and the radially extending edge 227 of the rotor 204 (and the magnets 217 of the rotor 204), thereby displacing some of the fluid (e.g., saltwater) that would otherwise be contained therebetween.

In accordance with various exemplary embodiments, the bearing materials 219, 220, 221 may be fluid-lubricated, non-magnetic materials. Such materials can include, but are not limited to, ceramic or diamond bearing material, composites, or thermoplastics or other polymers. Those of ordinary skill in the art would understand that the bearing materials 219, 220, 221 shown are exemplary only, and may have various configurations, dimensions, and/or arrangements between the rotor 204 and stator 206, and may be formed from various materials without departing from the scope of the present disclosure and claims.

In an alternative to the above described embodiments, for example, one or more of the bearing materials 219, 220, 221 can be attached to or formed as part of the rotor 204, with the respective facing surface of the stator 206 or the stop 218 being a polished-metal, porcelain-like, or composite material surface. In yet another alternative embodiment, one or more of the bearing materials 219, 220, 221 may be attached to or formed as part of the rotor 204 while the other bearing materials are attached to or formed as part of the stator 206. In still another alternative embodiment, one or more of the bearing materials 219, 220, 221 can be formed as an integral piece and disposed between the rotor 204 and the stator 206.

Those of ordinary skill in the art would also understand that the turbines 100, 200 illustrated in FIGS. 1-3 and described above are exemplary only, and that the blades 101, 201; rotors 104, 204; and stators 106, 206 may have various configurations, dimensions, shapes, and/or arrangements without departing from the scope of the present disclosure and claims. Furthermore, it would be understood by those of ordinary skill in the art that the turbines of the present disclosure may be configured to operate with various and changing directions of fluid flow (as illustrated by the multi-directional arrows illustrating the fluid flow F in the figures), and are configured to operate with both the ebb and flow of, for example, tidal currents, as well as currents coming from only one direction, such as, for example, river currents. For example, the shape of the blades 101, 201 may be different for turbines used in different environments (e.g., oceans vs. rivers), so as to optimize the potential energy collection from the two-directional and one-directional flows. In various embodiments, for example, blades which are swept backwards in both a tangential direction and an axial direction may be used, for example, in river applications (i.e., with one-directional flows), as disclosed in International Patent Application No. PCT/US2015/30373, entitled "Components for Hydroelectric Turbines," filed May 12, 2015, which is incorporated by reference in its entirety herein.

Turbine Support Structures and Systems Incorporating Same

Figure 4:
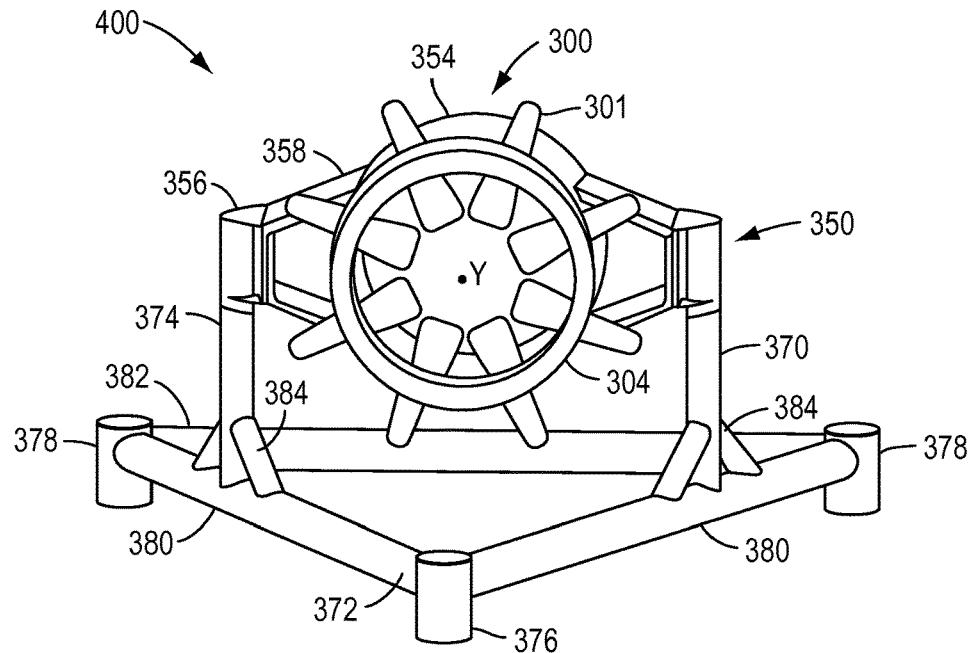
FIG. 4 is a front perspective view of an exemplary embodiment of a hydroelectric turbine system, including a hydroelectric turbine, an anchoring system and a bridge assembly, in accordance with the present disclosure.
Figure 5:
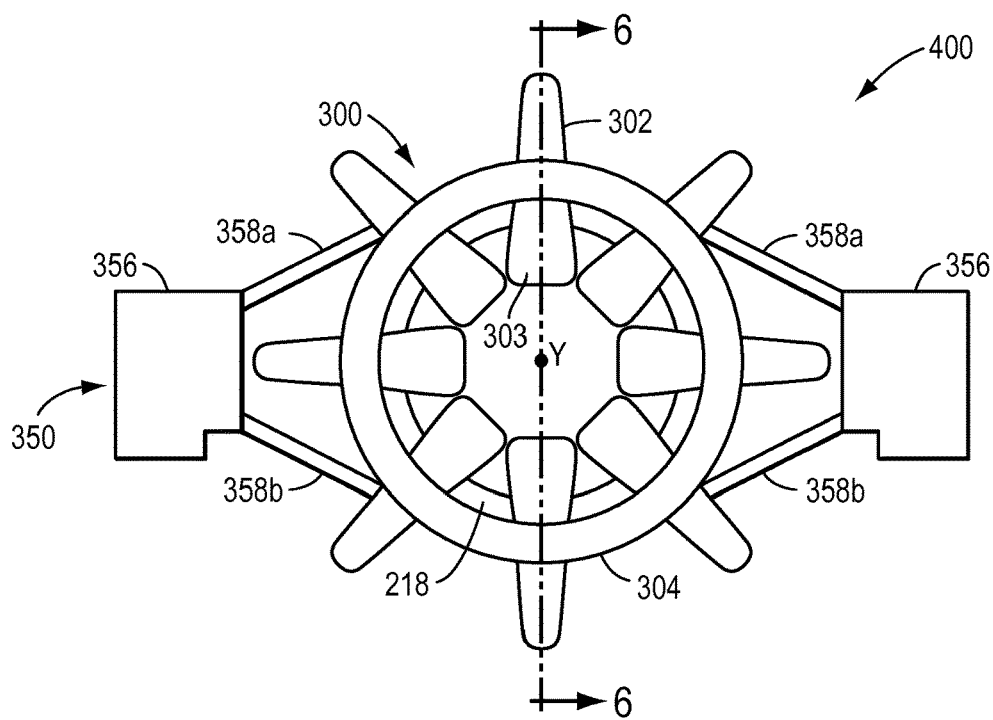
FIG. 5 is a front elevation view of the hydroelectric turbine system of FIG. 4.
Figure 6:
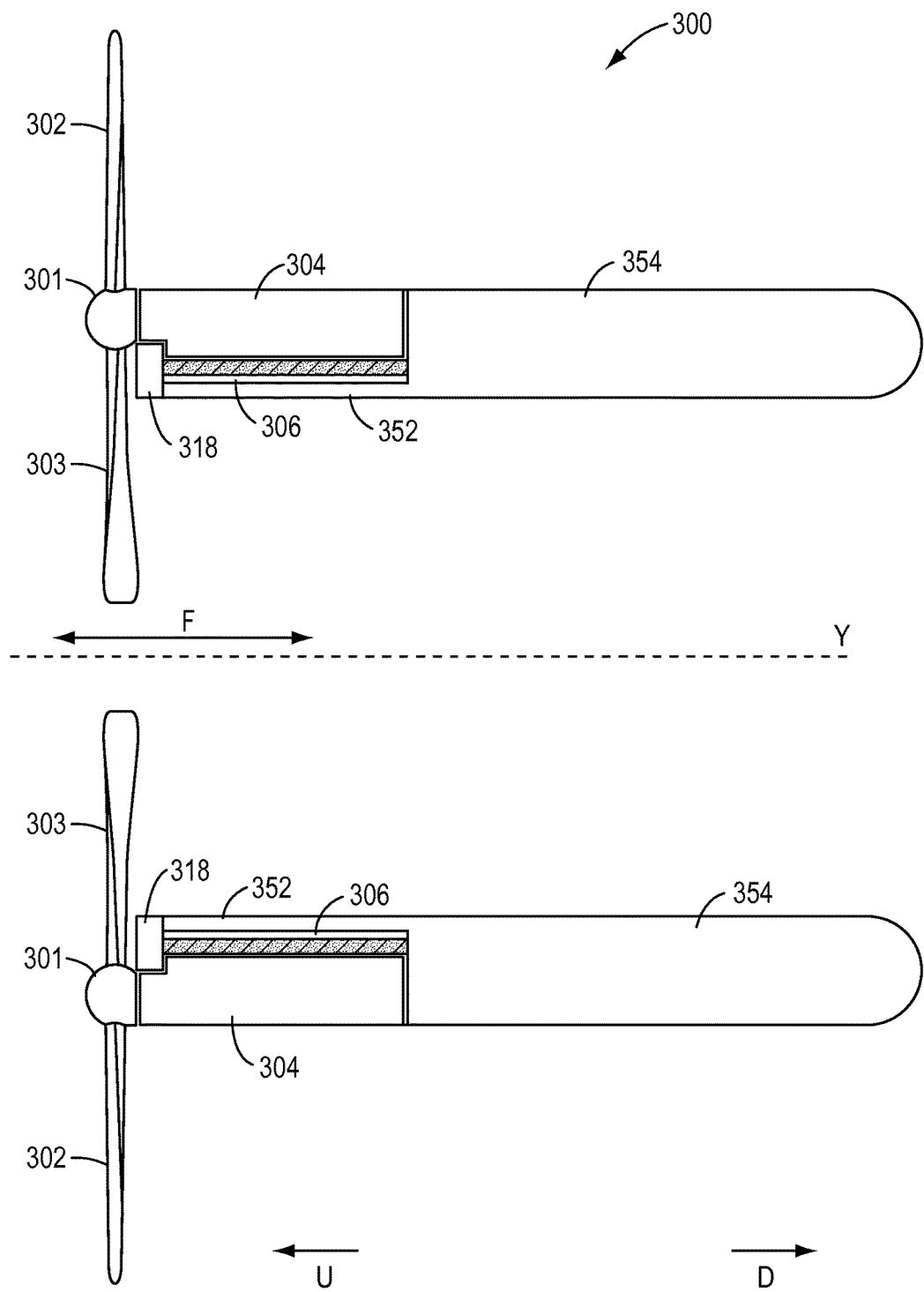
FIG. 6 shows cross-sectional views taken along line 6-6 of the hydroelectric turbine and bridge assembly of the system of FIG. 4, showing both the upper half and lower half of the cross-section of the turbine.
Figure 7:
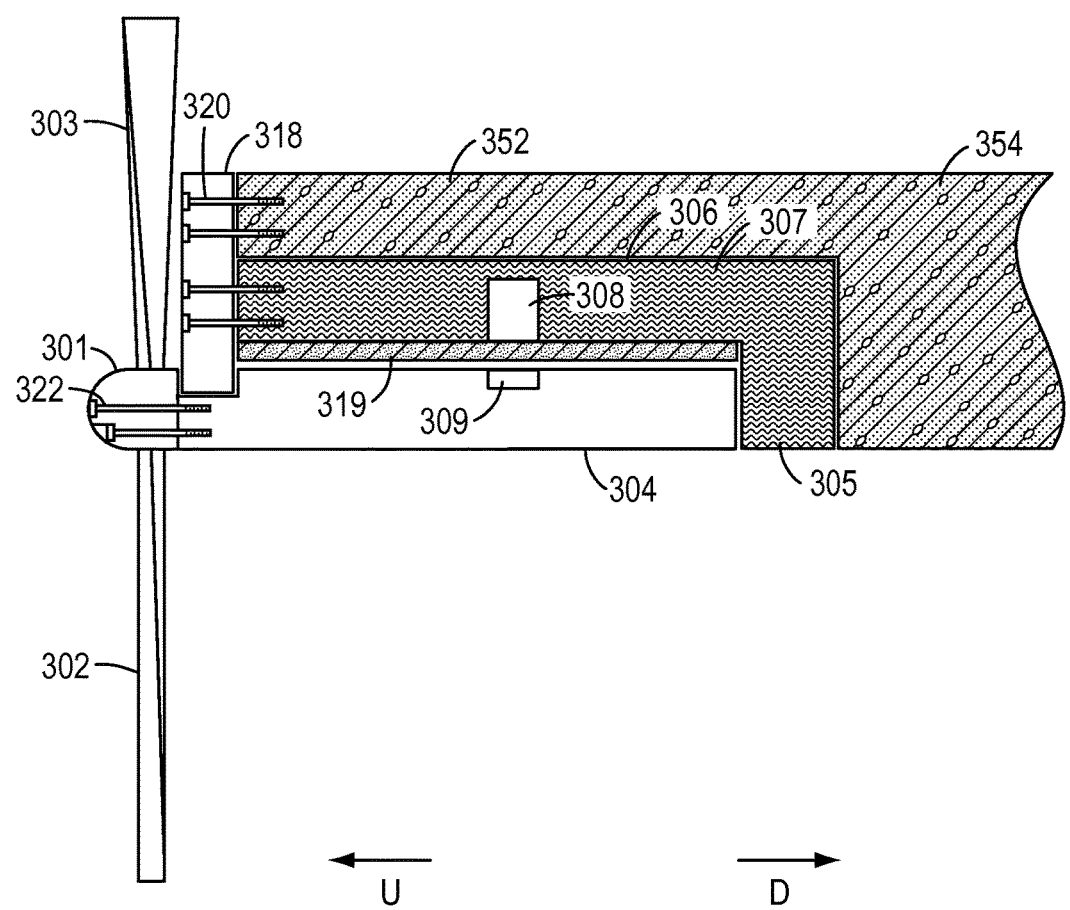
FIG. 7 is a partial, detailed view of the lower half of the cross-section of FIG. 6.

With reference now to FIGS. 4-7, an exemplary embodiment of a hydroelectric turbine system 400 including a hydroelectric turbine 300 and a bridge assembly 350 with an anchoring system 370 is shown. Similar to the above hydroelectric turbines 100, 200, the hydroelectric turbine 300 includes a rotor 304 that is disposed radially outward of a stator 306 (see FIGS. 6 and 7), which is held stationary with respect to the rotor 304. The turbine 300 further includes blades 301 attached to the rotor 304 and extending radially inward and/or outward therefrom (both directions being depicted in the exemplary embodiment of FIGS. 4-7). The rotor 304 is spaced radially from and substantially centered around the stator 306, which can be supported on an axially extending tongue 352 of a central supporting ring 354 of the bridge assembly 350, as shown in FIGS. 6 and 7 and described further below. The bridge assembly 350 can be coupled to an anchoring system 370, which holds the turbine 300 at a stationary location within the fluid flow (e.g., a river, ocean, or other moving fluid).

As shown in FIGS. 4 and 5, in various exemplary embodiments, the bridge assembly 350 includes attachment blocks 356, one or more laterally extending support arms 358, and a central supporting ring 354. The attachment blocks 356 can be disposed at opposite horizontal ends of the assembly 350 (in the orientation of FIGS. 4 and 5). The one or more support arms 358 can extend laterally inward from the attachment blocks 356 and support the supporting ring 352 centered between the attachment blocks 356. For example, the arms 358 can extend in a plane generally perpendicular to the axis of rotation Y of the turbine 300. Alternatively or additionally, the support arms 358 (and/or vertically extending pillars 374 of the anchoring system 370) can slant forward or backward, e.g., at an upstream or downstream angle relative to a plane perpendicular to the axis of rotation Y of the turbine 300.

The support arms 358 can also extend from the attachment blocks 356 at an angle, either upward or downward, relative to a horizontal plane, as illustrated in FIGS. 4 and 5, such that the arms 358 are out of alignment with a length of the blades 301 as the blades 301 rotate past the arms 358. This configuration can avoid or at least reduce the blocking of flow energy interacting with the blades 301 by the arms 358. In various embodiments, for example, the arms 358 are positioned to support both a top portion of the turbine 300 (i.e., upper arms 358a) and a bottom portion of the turbine 300 (i.e., lower arms 358b) may extend from the attachment blocks 356 in directions having both horizontal and vertical components, that is at an angle relative to horizontal in the orientation of FIG. 4. For example, the ends of upper arms 358a that are proximate the attachment block 356 may extend upwardly from a vertical height that is just above a center of the central supporting ring 354 to a vertical height that is coincident with or just below a top portion of the central supporting ring 354. And, the ends of lower arms 358b that are proximate the attachment block 356 can extend from a vertical height that is just above the center of the central supporting ring 354 to a vertical height that is coincident with or just above a bottom portion of the central supporting ring 354.

In accordance with various exemplary embodiments, the central supporting ring 354 can be a substantially tubular section or a cylinder with an open or hollow center (e.g., the central supporting 354 ring forms a hollow cylinder or a cylinder having an open-center configuration, and is not itself hollow) with a substantially circular transverse cross-section. This structural application of a hollow cylinder can be stiffer per unit weight than a solid member and may require less material. As shown in FIG. 6, the supporting ring 354 includes a tongue 352 that projects towards the blades 301 (e.g., upstream) and is constructed to support the stator 306 on a radially outer circumferential surface of the tongue 352.

As will be explained in more detail below, the bridge assembly 350 can be formed separate from and coupled to the anchoring system 370. In accordance with various exemplary embodiments, for example, the anchoring system 370 may include a tri-frame base 372 with one or more vertically extending support pillars 374. The attachment blocks 356 of the bridge assembly 350 can then couple to the vertical pillars 374 of the anchoring system 370 as shown in FIG. 4. In various embodiments, for example, each attachment block 356 may have a protrusion at a bottom end thereof that slips into a corresponding recess at a top portion of one of the vertical pillars 374. Alternatively, in various additional embodiments, each attachment block 356 may have an opening (e.g., a recess) at a bottom end thereof that receives a corresponding protrusion at the top portion of one of the vertical pillars 374. In yet another alternative embodiment, each attachment block 356 may have a recess at a bottom end thereof and each vertical pillar 374 can have a recess at a top end thereof, each recess being configured to receive one end of a dowel. As would be understood by those of ordinary skill in the art, various other attachment structures and methods can be used to removably and securely couple the bridge assembly 350 to the anchoring system 370 according to one or more contemplated embodiments.

As illustrated in FIG. 4, the anchoring system 370 includes a base with feet constructed to be disposed on a ground surface, such as, for example on a river bed or on an ocean floor. In various embodiments, for example, the anchoring system 370 may include a tri-frame base 372 with a front foot 376 disposed upstream and horizontally centered with the axis of rotation Y of the turbine 300, and two rear feet 378 horizontally spaced from the axis of rotation Y. One or more support members 380 can extend substantially horizontally and toward an upstream direction in order to connect each rear foot 378 to the front foot 376. Optionally, one or more rear support members 382 can also extend substantially horizontally and in a cross-flow direction to connect the rear feet 382 to each other.

As above, the anchoring system 370 may also include one or more substantially vertically extending pillars 374, which are configured to couple to the attachment blocks 356 of the bridge assembly 350. In various embodiments, for example, each vertical pillar 374 can be attached to or extend from a portion of the support member 380 between the front foot 376 and a respective rear foot 378. As would be understood by those of ordinary skill in the art, additional structures may also be coupled to each vertical pillar 374 and each respective support member 380 to buttress the vertical pillar 374. For example, in various exemplary embodiments, one or more diagonal strut arms 384 can be provided between the vertical pillar 374 and the support member 380.

In accordance with various exemplary embodiments of the present disclosure, the bridge assembly 350 and/or the anchoring system 370 can be formed from concrete and may be manufactured at a facility proximate to the installation site. This allows the relatively heavy and large scale portions of the turbine system to be made local to the installation site, if desired, thereby reducing shipping and fabrication costs. In contrast, as described in more detail below, the rotor 304 and stator 306 components can be manufactured remotely, if desired, and packaged in pieces, for cost-effective shipment to and assembly at the installation site.

Figure 11:
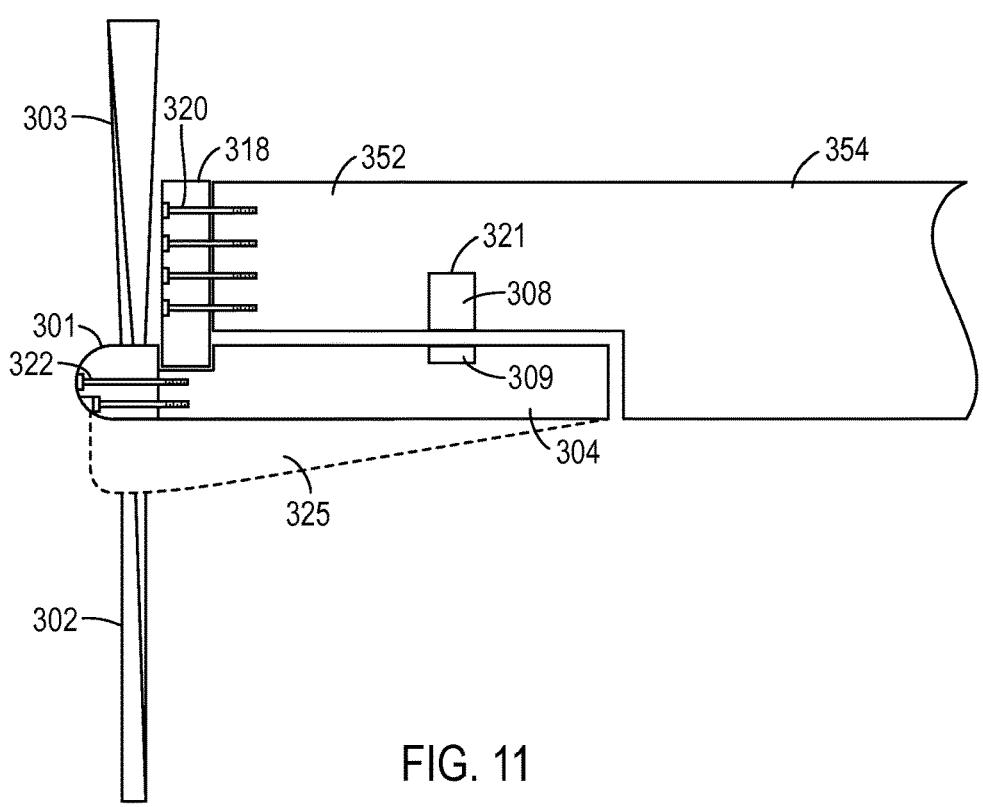
FIG. 11 is a partial, detailed view of the lower half of a cross-sectional view of yet another exemplary embodiment of a hydroelectric turbine in accordance with the present disclosure.

For example, the entire bridge assembly 350 can be cast as a single integral monolithic piece (e.g., by a continuous casting of a material without interruption) with its four structural arms 358, attachment blocks 356, and the supporting ring 354 at its center. In various exemplary embodiments, for example, the entire bridge assembly 350 may be cast via a continuous pour of concrete (e.g., to be formed from a composite material, such as, for example, concrete with rebar). In this manner, the tongue 352 may be attached to the supporting ring 354 (e.g., by extending the continuous pour of concrete all the way into the tongue 352), with the circular tongue 352 being designed to structurally underpin the rotor 304 with its blades 301 as they rotate. As illustrated in FIG. 11, in such embodiments, the L-shaped stator 306 (i.e., having a short arm 305 and a long arm 307) may be eliminated, and the stator coils 308 can be embedded in a notch 321 that is formed in the tongue 352.

Alternatively, the bridge assembly 350 can be constructed from separate individual pieces cast on-site or proximate to an installation site. For example, the attachment blocks 356, the arms 358, and/or the supporting ring 354 may be cast separately and subsequently coupled to the other components of the bridge assembly 350. In such embodiments, the tongue 352 may be mechanically attached to the supporting ring 354.

Additionally or alternatively, the anchoring system 370 can also be cast as a single integral monolithic piece (e.g., by a continuous casting of a material without interruption). Such fabrication may serve to optimize, or at least increase, strength from a minimum amount of material. Similar to the bridge assembly 350, the anchoring system 370 can, for example, be formed from a composite material, such as, for example, concrete with rebar.

Referring now to the detailed, partial (lower half) view of FIG. 7, as above, the hydroelectric turbine 300 includes a rotor 304 that is disposed radially outward of a stator 306. Similar to the embodiments of FIGS. 1-3, the stator 306 can have a substantially L-shaped configuration in cross-section with a long leg 307 of the L extending axially along the inner circumference of the rotor 304, and the short leg 305 of the L extending radially outward so as to align with the rotor 304. The rotor 304 can include one or more electricity-generating elements, which are disposed with respect to and configured to work in conjunction with one or more corresponding electricity-generating elements of the stator 306 when installed in the turbine 300. In various exemplary embodiments, for example, as above, the rotor 304 can include one or more magnets 309 disposed radially adjacent to (but spaced from) coils 308 on the stator 306. The magnets 309 can be mechanically attached to or embedded in an inner circumferential surface of the rotor 304 or be disposed within an interior of the rotor 304 proximal to the inner circumferential surface. Thus, as described above, flow energy via fluid flow interaction with the blades 301 may cause the rotor 304 to rotate around the outer circumferential surface of the stator 306. The rotation of the magnets 309 in the rotor 304 induces a voltage in coils 308 of the stator 306. The coils 308 are connected together in such a way so as to produce electricity of the desired voltage and/or current, and the resulting electricity can then be transmitted for subsequent use or storage, for example, via one or more transmission lines or conductors (not shown) connected to a land-based electrical grid.

In various exemplary embodiments, the magnets 309 and coils 308 are each covered in a marine epoxy to permanently fuse them in position and seal them from the fluid (e.g., sea water).

Although not shown in FIG. 7, as shown and described above with reference to FIG. 3, aside from the electricity-generating magnets 309, one or more sets of levitation magnets also may be provided and arranged relative to the rotor and stator to provide magnetic levitation and alignment of the rotor with respect to the stator, radially (see magnets 211, 212 of FIG. 3) and/or axially (see magnets 213, 214 and 216, 217 of FIG. 3), as the rotor rotates around the stator.

Also similar to the embodiments of FIGS. 1-3, the turbine 300 can have a front stop 318 disposed at an upstream end of the turbine. As above, the front stop 318 can prevent the rotor 304 from being axially displaced, for example, upstream, relative to the stator 306 during rotation of the turbine 300, and/or to prevent the rotor 304 from moving axially out of alignment with (e.g., moving off) the stator 306 during, for example, shut down or maintenance. Alternatively, the stator 306 can be provided with a separate radially extending portion at the upstream end instead of the front stop 318, in which case a rear stop (not shown) may be disposed at the downstream end of the stator 306 in place of or in addition to a flange (e.g., a short leg of a stator with an L configuration as described above with reference to FIG. 3).

Also as above, in various exemplary embodiments, the turbine 300 may include bearing materials disposed at various locations between the stator 306 and the rotor 304. In various embodiments, for example, the stator 306 can have a water-lubricated (or other fluid-lubricated) bearing material 319 attached to its radially outer surface and opposing the inner circumferential surface of the rotor 304. Alternatively, the bearing material 319 may be an integral part of the outer surface of stator 306. As discussed above, the present disclosure further contemplates various other variations and configurations for the bearing material 319.

Those of ordinary skill in the art would understand that the hydroelectric turbine system 400, including the hydroelectric turbine 300, the bridge assembly 350, and the anchoring system 370, described above and illustrated in FIGS. 4-7 is exemplary only, and that the arrangements, positioning, and numbers of the structural components of the turbine system can be varied without departing from the scope of the present disclosure and claims.

Methods of Assembling and Manufacturing Hydroelectric Turbines and Systems

As above, the bridge assembly 350 and/or the anchoring system 370 may be designed so as to be fabricated on-site, thereby saving, or at least reducing, the expense of shipping the assembly from a manufacturing plant to an installation location. And, the stator 306 and the rotor 304 may be manufactured at a plant and be shipped from the manufacturing plant to the installation location for assembly to the anchoring system 370.

Figure 8:
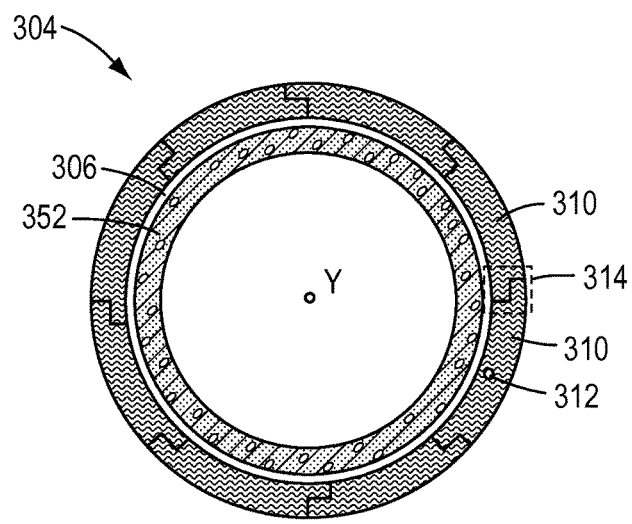
FIG. 8 is a rear cross-sectional view of an exemplary arrangement of stator sections on a bridge assembly, in accordance with the present disclosure.

In various embodiments, for example, the rotor 304 can be formed from a plurality of segments assembled together onsite. With reference to FIG. 8, for example, the rotor 304 can be formed of a plurality of arcuate segments 310. Each arcuate segment 310 can be substantially identical to the others, although one or more of the segments 310 can include a wire or cable 312 (which come from the stator 306) for conveying the electricity generated by the stator 306 for subsequent use or storage, for example, to a land-based electrical grid.

As shown in FIG. 8, each segment 310 can be a composite arc with all the desired elements (e.g., electricity-generating, levitation, and/or bearing elements) installed at the site of manufacturing and shipped in a compact form to an installation location of the turbine 300. Electrical connections can be made at circumferentially adjacent edges of the individual segments 310 to electrically couple them together. The circumferentially adjacent edges can also be configured to mechanically couple the segments 310 together, for example, via corresponding flanges such as illustrated at region 314 in FIG. 8. The present disclosure further contemplates other configurations for the ends of each segment 310, such as, but not limited to, tongue and groove joints, butt joints, miter joints, or any other type of interface known to those skilled in the art. Electrical connection and/or mechanical coupling between the adjacent segments 310 can further be effected by, for example, epoxy, solder, welding, or any other joining technique.

In various embodiments, each rotor segment 310 can have an arcuate profile as viewed from the front of the turbine 300 as illustrated in FIG. 8, and a substantially rectangular cross-sectional profile as viewed from the side of the turbine 300 as shown in FIG. 7. As further shown in FIG. 7, the stator 306 can have an L-shaped cross-sectional profile as viewed from the side of the turbine 300. In the embodiment of FIG. 7, for example, the stator 306 may be attached to the supporting ring 354 at either the long leg 307 of the L or the flange created by the short leg 305 of the L. For example, bolts, screws, rivets, nails, or any other connection mechanism may be used to attach the stator to a surface of the supporting ring 354. Alternatively or additionally, the stator 306 can be attached to the supporting ring 354 by an adhesive material, such as, for example, a glue, epoxy, or cement, applied between corresponding surfaces of the stator 306 and the supporting ring 354. In various additional embodiments, as shown in FIG. 7, the front stop 318 may also be configured to attach to the supporting ring 354, for example, at a front face of the tongue 352 via bolts 320 and to hold the rotor 304 and stator 306 to the supporting ring 354.

As also shown in FIG. 7, the blades 301 can be attached to the rotor 304, for example, at an upstream end thereof. In various embodiments, the blades 301 may be attached to the rotor via bolts 322, but screws, rivets, nails, or any other connection mechanism may be used to attach the blades 301 to the rotor 304. In this manner, the blades 301 may be easily accessed and removed from the rotor 304 for replacement (e.g., in the event that a blade 301 is damaged) or for changing/replacement of the blades 301 with different sized or configured blades 301 to accommodate, for example, different current strengths. River flows, for example, are often variable and may change drastically throughout the year, being strong and having higher speeds during spring run-offs and weaker and lower speeds at the end of the summer months or during times of drought. Accordingly, it may be desirable to change the size of the blades 301 of the turbine 300 based on the flow conditions of the river, or other body of water, in which the turbine 300 is deployed. For example, larger blades 301, with a larger surface area, may be used in low flow conditions, in comparison with the blades 301 used in high or normal flow conditions.

In various additional embodiments, one or more of the blades 301 may include an extended outer portion 325 that wraps at least partially around an outer surface of the rotor 304, as illustrated by the dotted lines in FIG. 11. In such embodiments, the blades may be attached to the front of the rotor 304 via bolts 322, and to the outer surface of the rotor 304 via a bolt (not shown), thereby allowing the blades 301 to carry forces more extensively into the rotor 304.

Figure 9:
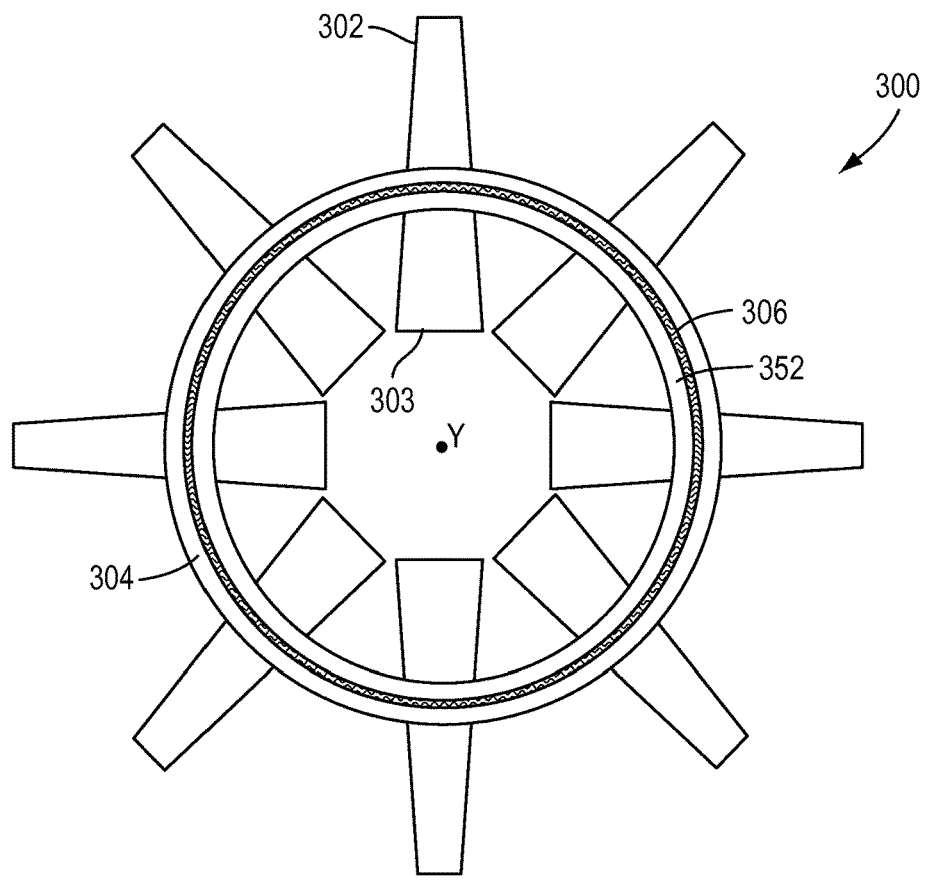
FIG. 9 is a front view illustrating an exemplary embodiment of a rotor with mounting portions for blades supported on a stator and bridge assembly, in accordance with the present disclosure.

As above, the blades 301 may include radially inward extending blade portions 303 and radially outward extending blade portions 302, which may be formed as an integral piece to be attached to the rotor 304. As shown in FIG. 9, in various exemplary embodiments, the blades 301 may be disposed around the circumference of the rotor 304 at regularly spaced angular intervals ranging from about 20 degrees to about 60 degrees, that is, the angular separation of adjacent blades may range from about 20 degrees to about 60 degrees.

The arrangement of the blades 301 with the blade portions 303, 302 extending both inwardly and outwardly relative to the rotor 304 can, for example, help to balance the forces acting on the rotor 304. For example, a moment produced by forces acting on the blade portion 302 may be balanced by the moment produced by forces acting on the blade portion 303. In addition, since the rotor 304 is disposed radially outside of the stator 306, the stator 306, and the tongue 352 of the supporting ring 354 underlying the stator 306, may support the rotor 304 in the radial direction. As a result, the rotor 304 may be made thinner and more flexible than would be needed for a turbine configuration using cantilevered blades extending radially inward from a rotor disposed inside of a stator.

In this manner, the rotor 304 can have a substantially thin radial thickness that is substantially uniform along its circumference, thereby having a flexible belt structure that permits the rotor 304 to ride around the outer surface of the stator 306, similar to a belt or rope over a pulley, but as explained above with opposing surfaces spaced apart from each other. This arrangement may allow the rotor 304 to bend/flex as it rotates. As a result, the rotor 304 may be more resilient and be less costly to manufacture and ship due to the reduced amount of materials needed to fabricate the rotor 304. In addition, because the rotor 304 can be disposed in tension over the stator 306, as opposed to compression, the rotor 304 may also have an increased strength.

Furthermore, the radially symmetric arrangement of the blades 301 about the rotor can result in larger sweeps in the current. Such a configuration may, for example, have the added benefit of less drag (which is non-productive) compared with turbines having only radially inward extending blades. Thus, more power can be produced for the same amount of drag with systems of the current disclosure, or conversely a smaller turbine can produce the same power with less drag, thereby requiring a smaller anchoring system.

As above, in accordance with various embodiments, a method for manufacturing and installing a hydroelectric turbine system, such as, for example, the turbine system 400 can include casting a monolithic anchoring system 370 and a monolithic bridge assembly 350 at a location proximate to an installation site of the turbine system 400. The method can further include manufacturing the rotor segments 310, the stator 306, and/or the blades 301 at a location remote from the installation site and packaging the unassembled rotor 304, stator 306, and/or blades 301 for shipment to the installation site. Thus, the fabrication of the bridge assembly 350 (e.g., with its tongue 352 extending under the stator housing (not shown)) and the anchoring system 370 can be performed very near to the installation site, with the rotor 304, stator 306, and blades 301, being fabricated elsewhere and shipped to be assembled at the installation (i.e., deployment) site. In other words, the bridge assembly 350 and anchoring system 370 can be fabricated at a separate site from the rotor 304, stator 306, and blades 301.

As above, the monolithic anchoring system 370 can include a substantially horizontal tri-frame base 372 with one or more supporting members 380. The anchoring system 370 can also include a pair of pillars 374, each of which extends in a substantially vertical direction (although it may be angled upstream or downstream) from one of the supporting members 380. The monolithic anchoring system 370 may be installed at the installation site, for example, by contacting the feet 376, 378 of the assembly with a ground surface at the bottom of the moving body of water (e.g., a river bed or ocean floor). In various embodiments, the feet 376, 378 may include features designed to grip the ground surface to prevent the turbine system 400 from being displaced by the moving body of water. For example, the feet 376, 378 may include cleats. Alternatively, the feet 376, 378 may couple to structures previously inserted into the ground surface, such as, for example, pylons in the ground surface.

The monolithic bridge assembly 350 can be fabricated to include one or more attachment blocks 356, a plurality of support arms 358, and a central supporting ring 354 coupled to ends of the support arms 358. The monolithic bridge assembly 350 may be installed at the location site by coupling the attachment blocks 356 to respective ends of the vertical pillars 374 of the anchoring system 370. In accordance with various exemplary embodiments, the anchoring system 370 may be installed in the moving body of water at the installation site, after which the bridge assembly 350 is lowered onto the vertical pillars 374 in the moving body of water. In alternative embodiments, the anchoring system 370 and the bridge assembly 350 are coupled together before being installed in the moving body of water.

The method may further include assembling a plurality of pre-fabricated rotor segments 310 (i.e., at a manufacturing plant) on a support tongue 352 (via the long leg 307 of the stator 306) of the central supporting ring 354 of the bridge assembly 350. For example, as described above and shown in FIG. 8, the rotor segments 310 are substantially arcuate segments that fit together on an outer circumferential surface of the long leg 307 of the stator 306 (which is coupled to the support tongue 352) to form the rotor 304 of the turbine 300. The rotor 304 may, for example, be made of a composite material encapsulating the electricity generating components, and an electrical cable may be connected to the stator 306 for conveying generated electricity from the turbine system 400 for use or storage. In various embodiments, for example, the segments 310 (or composite arcs) may be fabricated with preformed slots for the magnets of the axial bearing system (e.g., magnets 213 and 217). Such slots may be precisely positioned, for insertion of pre-manufactured Lego®-like pieces, each containing a magnet of a correct polarity and given orientation. Once inserted into the slots, each Lego®-like piece may, for example, then be bathed with a marine epoxy to permanently fuse the piece in position and seal it from the fluid (e.g., the sea water).

For example, as above, the rotor 304 can have a flexible belt structure that is radially spaced from an outer circumferential surface of the stator 306 and centered with respect to the central support ring 354 and/or the stator 306. A front stop 318 may then be installed to retain the rotor 304 in place with respect to the stator 306. As above, the front stop 318 may be attached to the stator 306 or the supporting tongue 352 of the bridge assembly 350.

As above, in accordance with various embodiments, the rotor 304 may be built in a series of arc segments 310, for example, each spanning an angular extent ranging from about 20 degrees to about 60 degrees. The segments 310 may be cast to provide a connection point for subsequent attachment of the blades 301. To manufacture the rotor 304 (e.g., the rotor belt), in various exemplary embodiments, the segments 310 may be mechanically fastened (temporarily) around the outside of a mandrel of appropriate shape and size. Then, strips of carbon-fiber tape, which are infused with epoxy resin, may be layered around the outer surface of the segments 310, for example, via an automated, computer-controlled machine laying the strips as the mandrel is rotated. For example, a spray gun on the outside of the mandrel may be used to spray the epoxy resin on the carbon fiber tape as the strips are layered on the outside of the mandrel.

After the carbon fiber has been deposited in a sufficient number of layers and thickness, the layering process may be interrupted for a short period of time to form mounting points for the blades 301, which will be fastened to the rotor 304 during assembly of the turbine structure. Such mounting points, for example, may reach back into the surface of the partially formed carbon fiber belt to the segments 310 for structural support. The mandrel may then resume its rotation, to continue layering more composite carbon fiber material to complete the rotor belt being formed on the mandrel.

Once a desired structural strength has been achieved and the belt has a sufficient number of layers and thickness of composite carbon fiber material, the mandrel may be placed, for example, in an autoclave to bake the layered segments 310 of the rotor 304 to hardness. After baking, the mandrel may be collapsed and removed, leaving the rotor 304 behind.

The rotor segments 310 can be made of a composite material with slots or the like cast in the inner surface to accommodate insertion and securing (e.g., via epoxy or other adhesive) of magnets prior to the layering of the segments with the composite carbon fiber material. In various embodiments, for example, as above, the composite segments 310 may be fabricated with preformed slots for the magnets of the axial bearing system (e.g., magnets 213 and 217). Such slots may be precisely positioned, for insertion of pre-manufactured Lego®-like pieces, each containing a magnet of a correct polarity and given orientation. Once inserted into the slots, each Lego®-like piece may, for example, then be bathed with a marine epoxy to permanently fuse the piece in position and seal it from fluid (e.g., the sea water). In various additional embodiments, each Lego®-like piece may have a pattern (i.e., cast into the piece) to allow the piece to better grip the composite carbon fiber material, which will be layered over the segments 310.

The method can further include attaching one or more blades 301 to the rotor 300. In exemplary embodiments, the blades 301 can be attached to the rotor 304 either prior to placing the rotor 304 on the stator 306 or after the rotor 304 is installed on the stator 306. In alternative embodiments, the blades 301 can be attached to the rotor 304 after placing the rotor 304 on the stator 306. In accordance with various exemplary embodiments, the blades 301 can be attached to the rotor 304, for example, via bolts 322, but screws, rivets, nails, or any other connection mechanism may be used to attach the blades 301 to the rotor 304. In this manner, the blades 301 may be easily accessed and removed from the rotor 304 for replacement (e.g., in the event that a blade 301 is damaged) or for changing/replacement of the blades 301 with different sized or configured blades 301 to accommodate, for example, different current strengths.

As would be understood by those of ordinary skill in the art, although the present disclosure is generally described with reference generating energy via tidal currents, the turbines and features disclosed herein are applicable to a wide range of fluid flow applications including, but not limited to, ocean and tidal environments, rivers, and streams, as well as fluids other than water.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be included in the second embodiment.

It is noted that, as used herein, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure. For example, spatially relative terms—such as "upstream," downstream," "beneath," "below," "lower," "above," "upper," "forward," "front," "behind," and the like—may be used to describe one element's or feature's relationship to another element or feature as illustrated in the orientation of the figures. These spatially relative terms are intended to encompass different positions and orientations of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices may include additional components that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure.

It is to be understood that the particular examples and embodiments set forth herein are non-limiting, and modifications to structure, dimensions, materials, and methodologies may be made without departing from the scope of the present disclosure. Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents.

What is claimed is:

1. A hydroelectric turbine comprising:
   a stator comprising a first plurality of electricity-generating elements;
   a rotor comprising a second plurality of electricity-generating elements, wherein the rotor is disposed radially outward of an outer circumferential surface of the stator and configured to rotate around the stator about an axis of rotation, wherein the rotor is in tension and configured to flex during rotation of the rotor around the stator;
   a plurality of blades attached proximate a first axial end of the rotor, each of the plurality of blades comprising a first blade portion extending radially inward with respect to the rotor and a second blade portion extending radially outward with respect to the rotor, the plurality of blades being configured to interact with fluid currents flowing in a direction substantially parallel to the axis of rotation to cause the rotor to rotate about the axis of rotation; and
   at least one bearing mechanism configured to support the rotor relative to the stator during rotation of the rotor around the stator,
   wherein the rotor has an inner circumferential surface facing the outer circumferential surface of the stator, and
   wherein the at least one bearing mechanism comprises a plurality of wood or wood composite teeth attached to the stator in a row along the outer circumferential surface of the stator, the plurality of wood or wood composite teeth being positioned to be received in corresponding slots formed in the inner circumferential surface of the rotor.

2. The hydroelectric turbine of claim 1, further comprising at least one additional bearing mechanism comprising:
   a first set of levitation magnets disposed to produce a radially directed repulsive force between the rotor and the stator, the radially directed repulsive force being sufficient to levitate the rotor relative to the stator during rotation of the rotor around the stator; and
   a second set of levitation magnets disposed to produce an axially directed repulsion force between the rotor and the stator, the axially directed repulsion force being sufficient to axially align the rotor relative to the stator during rotation of the rotor around the stator.

3. The hydroelectric turbine of claim 1, further comprising at least one additional bearing mechanism comprising an elastic polymer alloy bearing.

4. The hydroelectric turbine of claim 1, wherein the first plurality of electricity-generating elements comprises coils, and wherein the second plurality of electricity-generating elements comprises magnets.

5. The hydroelectric turbine of claim 1, wherein the inner circumferential surface of the rotor comprises stainless steel or carbon fiber and the outer circumferential surface of the stator comprises a wood or composite material.

6. The hydroelectric turbine of claim 1, wherein the stator has an L-shape in cross-section, an arm of the L-shape being disposed adjacent to an edge at an axial end of the rotor.

7. The hydroelectric turbine of claim 5, wherein the wood or composite material is disposed within slots within the stator to serve as a radial bearing between the rotor and the stator.

8. The hydroelectric turbine of claim 1, wherein the plurality of blades is configured to balance moment forces acting on the rotor during rotation of the rotor.

9. The hydroelectric turbine of claim 1, wherein each of the slots includes a bearing surface configured to slide over sides of the wood or wood composite teeth, such that, during rotation of the rotor, a fluid within each slot provides a hydrodynamic bearing to contain an axial load of the turbine.

10. The hydroelectric turbine of claim 1, wherein the stator is a concrete structure.

11. The hydroelectric turbine of claim 1, wherein the rotor comprises a plurality of composite arcs fastened together.

12. A hydroelectric turbine system comprising:
    a bridge assembly comprising a central supporting ring having an axially elongated body, such that an axial length of the body is greater than a radial thickness of the body, and a tongue extending axially from the body, wherein the radial thickness of the body is greater than a radial thickness of the tongue;
    a stator having a radially inner circumferential surface and a radially outer circumferential surface, the radially inner circumferential surface being disposed on a radially outer surface of the tongue;
    a rotor supported radially outward of the stator and configured to rotate relative to the stator about an axis of rotation; and
    a bearing mechanism comprising a plurality of wood or wood composite teeth attached to the stator in a row along the radially outer circumferential surface of the stator, the plurality of wood or wood composite teeth being positioned to be received in corresponding slots formed in an inner circumferential surface of the rotor.

13. The hydroelectric turbine system of claim 12, wherein the plurality of wood or composite teeth is configured to be lubricated by a fluid.

* * * * *